US012251849B1

(12) United States Patent
Marfione

(10) Patent No.: US 12,251,849 B1
(45) Date of Patent: Mar. 18, 2025

(54) FIXED BLADE KNIFE

(71) Applicant: Anthony L. Marfione, Mills River, NC (US)

(72) Inventor: Anthony L. Marfione, Mills River, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/916,053

(22) Filed: Oct. 15, 2024

(51) Int. Cl.
*B26B 3/00* (2006.01)
*B26B 1/04* (2006.01)

(52) U.S. Cl.
CPC . *B26B 3/00* (2013.01); *B26B 1/04* (2013.01)

(58) Field of Classification Search
None
See application file for complete search history.

(56) References Cited

U.S. PATENT DOCUMENTS 1,485,571 A * 3/1924 Stevens .................... B25G 3/26 411/339
4,355,465 A * 10/1982 Besson ............. B29C 66/81423 30/344
4,524,514 A * 6/1985 Mallalieu ................. B25G 3/26 30/169
4,870,757 A * 10/1989 Kirkpatrick .............. B25G 3/26 30/344
5,605,495 A * 2/1997 Jenkins, Jr. ............. B26B 11/00 76/82
11,945,126 B1 * 4/2024 Marfione .................. B26B 1/08
2012/0151777 A1 6/2012 Ritter
2014/0157606 A1 6/2014 Owens et al.
2018/0099423 A1 4/2018 Mundhra
2019/0270194 A1 9/2019 Constantine et al.
2020/0023509 A1 1/2020 Jovanovich
2024/0066727 A1 * 2/2024 Helzer .................... B26B 11/00
2024/0131678 A1 4/2024 Kielsmeier et al.
2024/0300127 A1 9/2024 Vorhis et al.

* cited by examiner

*Primary Examiner* — Hwei-Siu C Payer
(74) *Attorney, Agent, or Firm* — Steve LeBlanc, LLC

(57) ABSTRACT

A fixed blade knife includes a first scale having a first scale inner surface and a second scale opposed to the first scale having a second scale inner surface. A blade has a cutting edge that extends from the first and second scales and a tang that extends between the first scale inner surface and the second scale inner surface. A first recess in the first scale inner surface extends from the first scale inner surface partially through the first scale, and a first flange is around at least a portion of the first recess in the first scale inner surface. A first boss extends from the tang of the blade into the first recess in the first scale inner surface, and a perimeter of the first boss increases away from the tang of the blade.

15 Claims, 9 Drawing Sheets

FIXED BLADE KNIFE

FIELD OF THE INVENTION

The present invention generally involves a fixed blade knife.

BACKGROUND OF THE INVENTION

Fixed blade knives are generally considered stronger and more durable than folding knives because a fixed blade knife has a blade that is fixed with respect to a handle or chassis. The blade has a cutting edge on one or both sides and a tang that extends partially or fully through the handle. The handle often includes a pair of scales connected to one another through the tang of the blade. Screws may extend through one or both scales to align and securely connect the scales to the tang of the blade and/or to one another, while also facilitating disassembly of the handle when needed to repair or replace the blade or scales. However, the screws and their associated counterbores may be damaged during assembly or maintenance, and screws that extend through one or both scales interfere with an aesthetically clean appearance of the handle. Therefore, the need exists for an improved fixed blade knife design that reduces the need for screws or counterbores to pass completely through the scales.

BRIEF DESCRIPTION OF THE INVENTION

Aspects and advantages of the invention are set forth below in the following description, or may be obvious from the description, or may be learned through practice of the invention.

One embodiment of the present invention is a fixed blade knife that includes a first scale having a first scale inner surface and a second scale opposed to the first scale having a second scale inner surface. A blade has a cutting edge that extends from the first and second scales and a tang that extends between the first scale inner surface and the second scale inner surface. A first recess in the first scale inner surface extends from the first scale inner surface partially through the first scale, and a first flange is around at least a portion of the first recess in the first scale inner surface. A first boss extends from the tang of the blade into the first recess in the first scale inner surface, and a perimeter of the first boss increases away from the tang of the blade.

An alternate embodiment of the present invention is a fixed blade knife that includes a first scale having a first scale inner surface and a second scale opposed to the first scale having a second scale inner surface. A blade has a tang that extends between the first scale inner surface and the second scale inner surface. A first recess in the first scale inner surface extends from the first scale inner surface partially through the first scale, and a diameter of the first recess decreases toward the first scale inner surface. A first boss extends from the tang of the blade into the first recess in the first scale inner surface, and a perimeter of the first boss increases away from the tang of the blade.

In yet another embodiment of the present invention, a fixed blade knife includes a first scale having a first scale inner surface and a second scale opposed to the first scale having a second scale inner surface. A blade has a tang that extends between the first scale inner surface and the second scale inner surface. The fixed blade knife further includes a means for aligning the first scale to the second scale.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
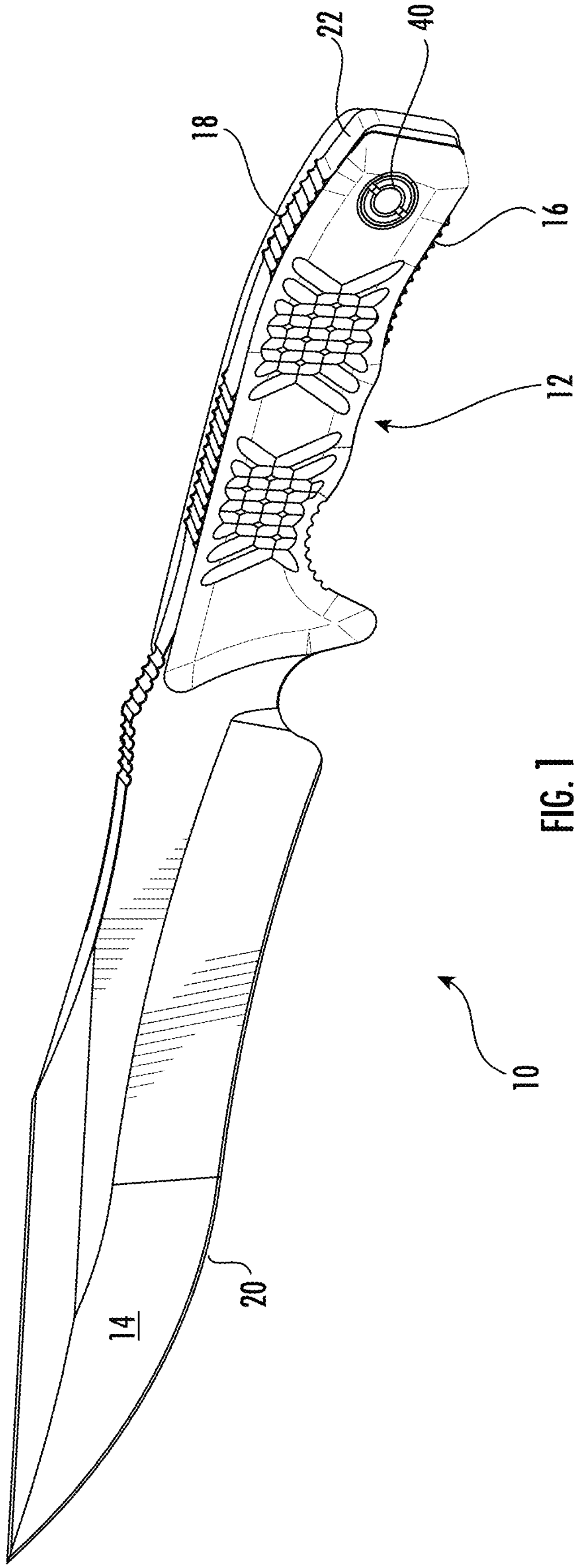
FIG. 1 is a left perspective view of a fixed blade knife according to various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a fixed blade knife having a handle or chassis formed from opposing scales. The handle includes a combination of one or more bosses and recesses that align the opposing scales and reduce the need for screws or counterbores to pass completely through the opposing scales. Unless specifically recited in the claims, the fixed blade knife may have a cutting edge on one or both sides and a tang that extends partially or fully through the handle. For convention of reference, the term "front" shall refer to the end of the fixed blade knife with the cutting edge; the term "rear" shall refer to the end of the fixed blade knife that is opposite from the front; the term "longitudinal" shall refer to the direction between the front and rear of the fixed blade knife; and the term "radial" shall refer to any direction perpendicular to the longitudinal direction.

Figure 2:
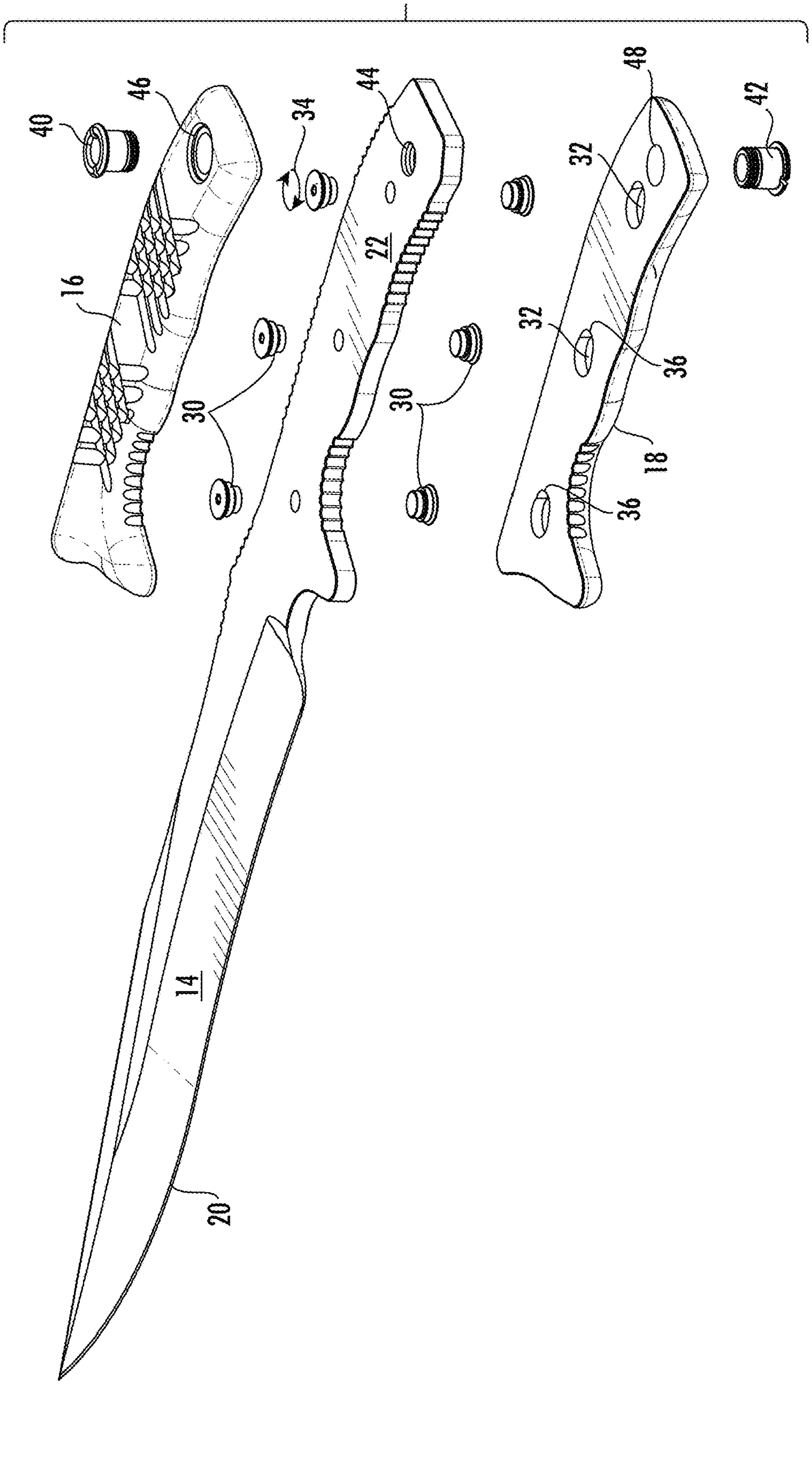
FIG. 2 is an exploded view of the fixed blade knife shown in FIG. 1.

FIG. 1 provides a left perspective view of a fixed blade knife 10 according to one embodiment of the present invention, and FIG. 2 provides an exploded view of the fixed blade knife shown in FIG. 1. As shown in FIGS. 1 and 2, the fixed blade knife 10 generally includes a handle 12 fixedly connected to a blade 14. The handle 12 provides a frame for holding the blade 14 and may be molded, pressed, or machined from plastics, metals, polymers, or any material or combination of materials having the desired strength and durability. The handle 12 generally includes a first or left scale 16 opposed to a second or right scale 18. The front portion of the blade 14 generally has one or more cutting edges 20 that may be smooth, serrated, or some combination of smooth and serrated. The rear portion of the blade 14 includes a tang 22 that may extend partially or fully through the handle 12 as shown in FIG. 2.

Figure 3:
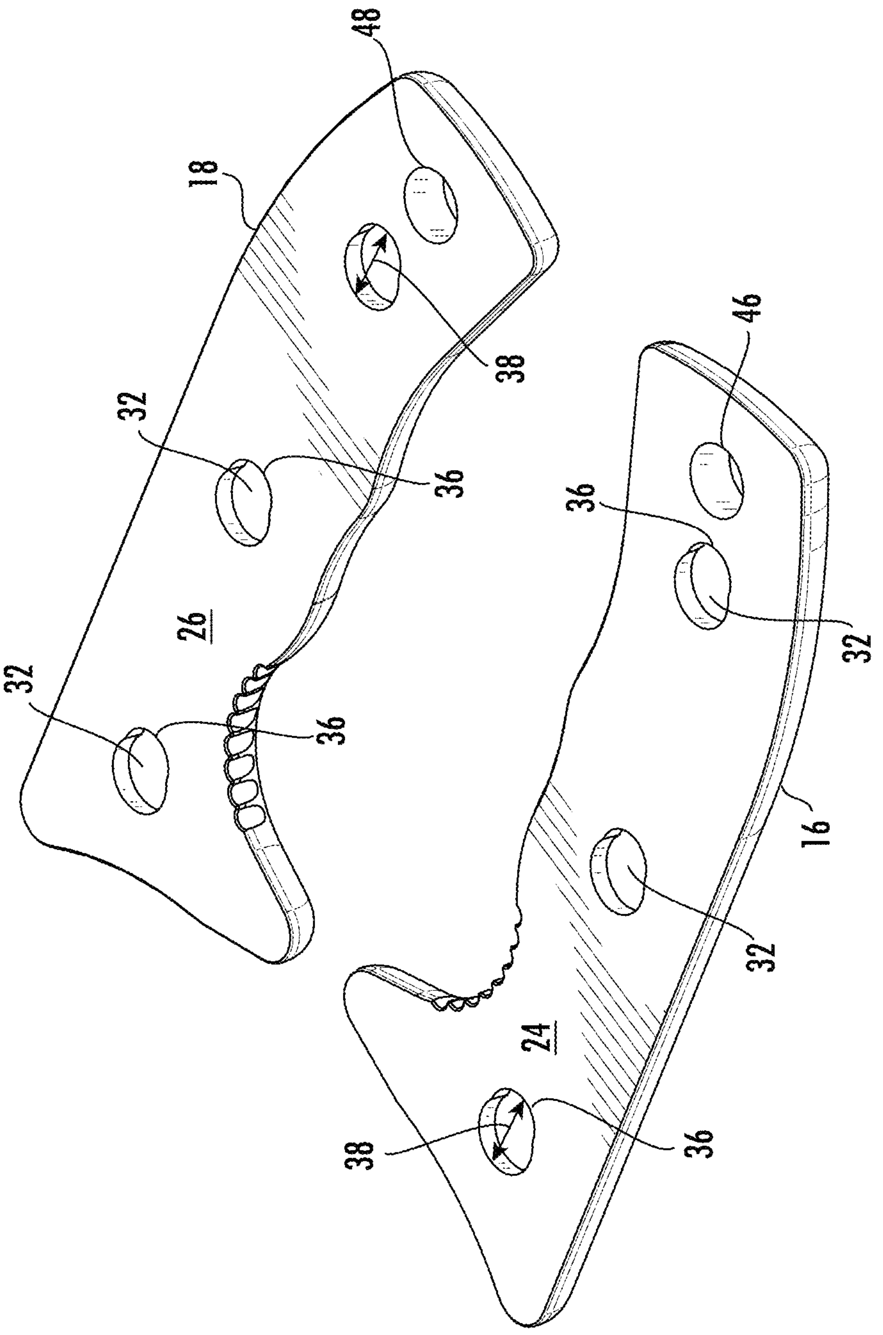
FIG. 3 is a perspective view of the left and right scales shown in FIGS. 1 and 2.

FIG. 3 provides a perspective view of the left and right scales 16, 18 shown in FIGS. 1 and 2. As shown most clearly in FIG. 3, the first or left scale 16 has a first scale inner surface 24, and the second or right scale 18 has a second scale inner surface 26. When assembled together, the first and second scales 16, 18 sandwich the tang 22 of the blade 14 between the first scale inner surface 24 and the second scale inner surface 26.

Figure 4:
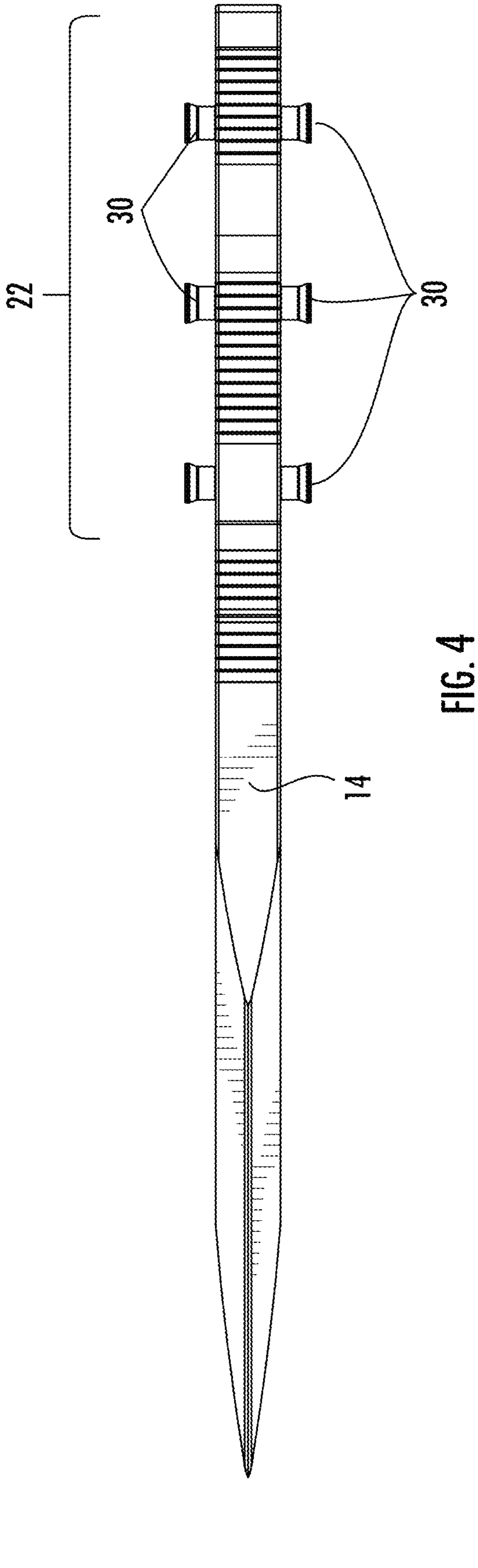
FIG. 4 is a top plan view of the blade shown in FIG. 2.
Figure 5:
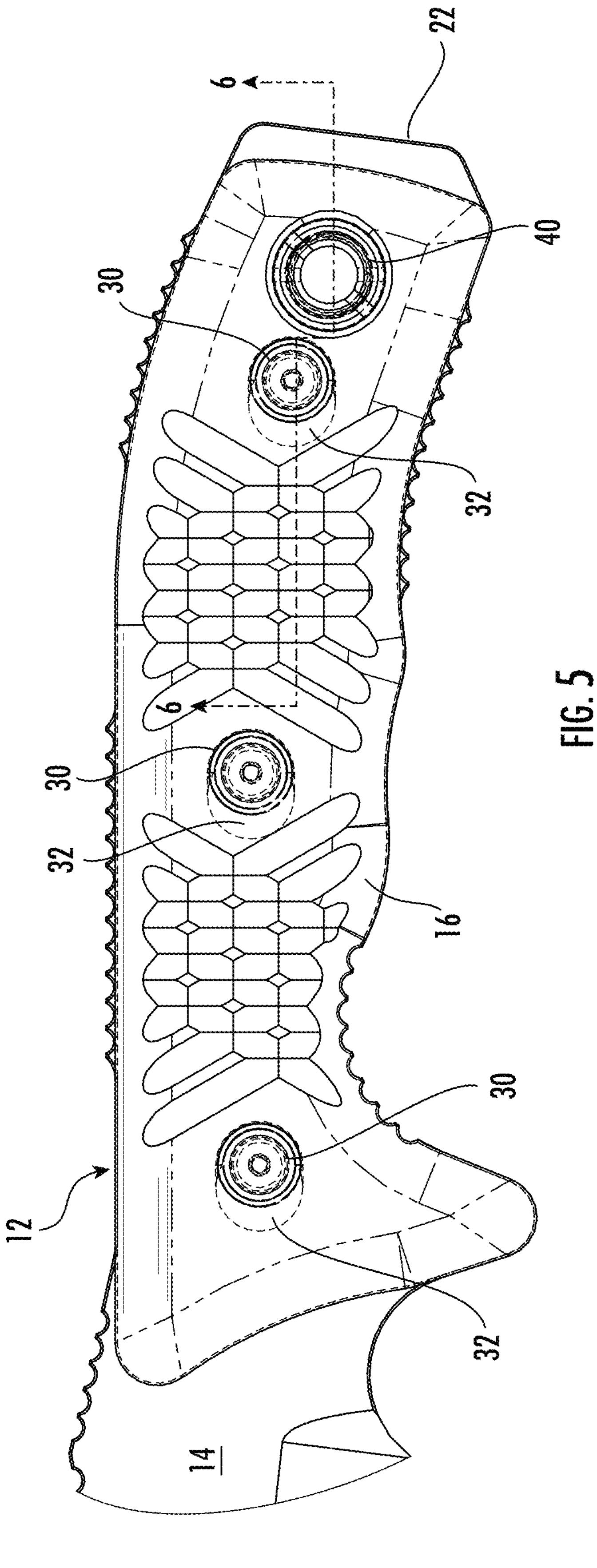
FIG. 5 is side plan view of the handle shown in FIGS. 1 and 2 with portions of the left scale shown in phantom.
Figure 6:
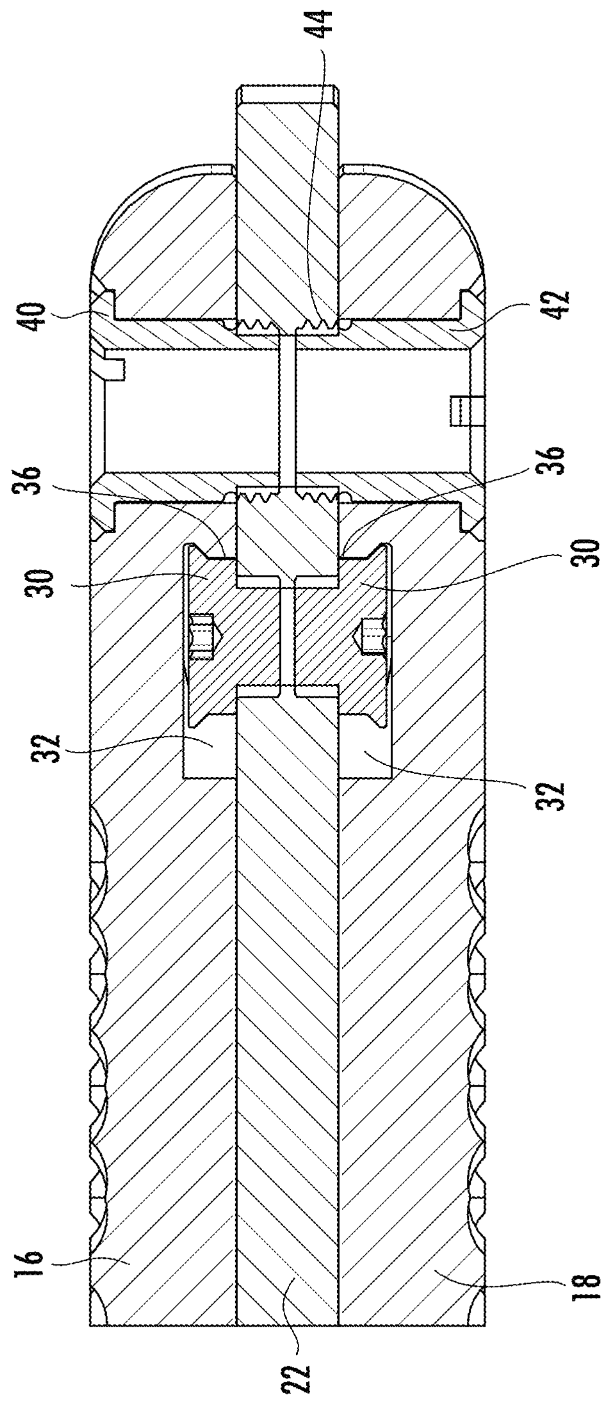
FIG. 6 is cross-section of the handle shown in FIG. 5 taken along 6-6.

FIG. 4 provides a top plan view of the blade 14 shown in FIG. 2; FIG. 5 provides side plan view of the handle 12 shown in FIGS. 1 and 2 with portions of the left scale 16 shown in phantom; and FIG. 6 provides cross-section of the handle shown in FIG. 5 taken along 6-6. As shown in FIGS. 2-6, the fixed blade knife 10 includes a means for aligning the first or left scale 16 to the second or right scale 18. The function of the means is to align the first or left scale 16 to the second or right scale 18. The structure for aligning the first or left scale 16 to the second or right scale 18 is one or more bosses 30 that extend into corresponding one or more recesses 32. The bosses 30 may extend from the tang 22 of the blade 14 into corresponding recesses 32 in the first scale inner surface 24 and the second scale inner surface 26. Alternatively, the bosses 30 may extend from the first scale inner surface 24 and the second scale inner surface 26 into corresponding recesses in the tang 22 of the blade 14, and the present invention is not limited to any configuration unless specifically recited in the claims.

In the particular embodiment shown in FIGS. 2-6, each boss 30 extends from the tang 22 of the blade 14 into a corresponding recess 32 in the first scale inner surface 24 or the second scale inner surface 26. Each boss 30 may be extruded from or threaded into the tang 22 of the blade 14. Alternately, as shown most clearly in FIG. 6, each boss 30 may be press fit into the tang 22 of the blade 14. As shown most clearly in FIGS. 2, 4, and 6, each boss 30 is tapered in the radial direction toward the tang 22 of the blade 14 so that a perimeter 34 of the boss 30 increases in the radial direction away from the tang 22 of the blade 14.

As shown in FIGS. 3 and 5 and most clearly in FIG. 6, each recess 32 in the first scale inner surface 24 extends radially from the first scale inner surface 24 partially through the first or left scale 16, and each recess 32 in the second scale inner surface 26 extends radially from the second scale inner surface 26 partially through the second or right scale 18. Each recess 32 further includes a flange 36 around at least a portion of the recess 32 so that a diameter 38 of the recess 32 decreases in the radial direction toward the respective first or scale inner surface 24, 26. In addition, each recess 32 may be elongated longitudinally at the respective first or second scale inner surface 24, 26 to more easily receive the corresponding boss 30 and allow the boss 30 to slidingly engage with the flange 36 around at least a portion of the recess 32 in the first or second scale inner surface 24, 26.

As shown in the right portion of FIGS. 2 and 5 and most clearly in FIG. 6, the fixed blade knife 10 may further include a means for releasably connecting the first or left scale 16 to the second or right scale 18. The function of the means is to releasably connect the first or left scale 16 to the second or right scale 18. The structure for performing the function may include one or more screws or fasteners that releasably engage with the left and/or right scales 16, 18 and/or the tang 22 of the blade 14. In the particular embodiment shown in FIGS. 2, 5, and 6, the structure for releasably connecting the first or left scale 16 to the second or right scale 18 is a first or left screw 40, a second or right screw 42, and threads 44 in the tang 22. The left screw 40 fits through an aperture 46 in the left scale 16 and threads into the tang 22. The right screw 42 similarly fits through an aperture 48 in the right scale 18 and threads into the tang 22. In this manner, the left and right screws 40, 42 releasably connect the left and right scales 16, 18, respectively, to the threads 44 in the tang 22, thereby releasably connecting the left scale 16 to the right scale 18.

Figure 7:
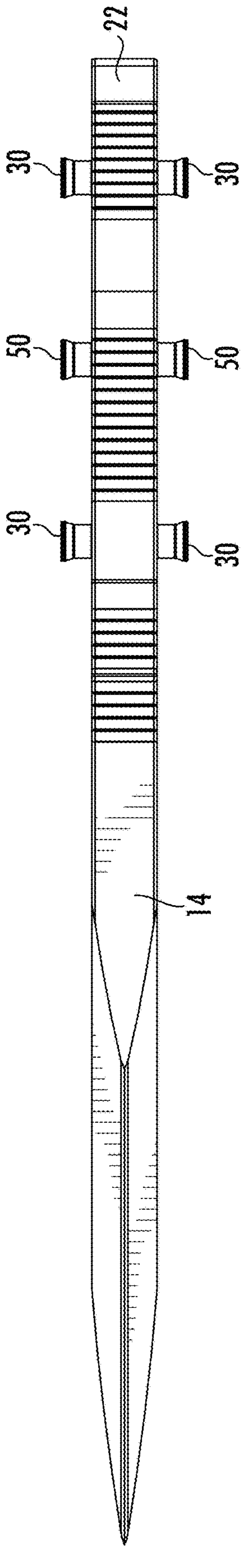
FIG. 7 is a top plan view of the blade and bosses according to an alternate embodiment of the present invention.
Figure 8:
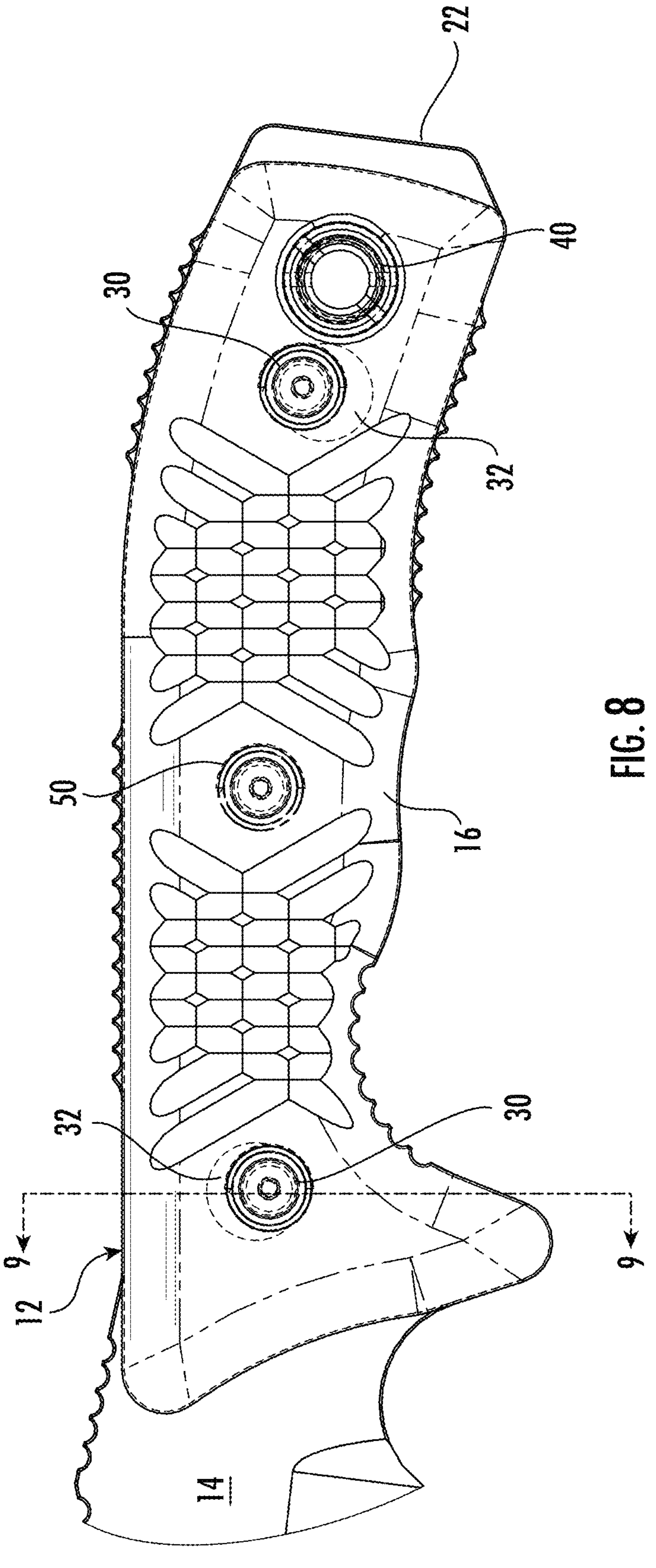
FIG. 8 is side plan view of the handle shown in FIG. 1 according to an alternate embodiment with portions of the left scale shown in phantom.
Figure 9:
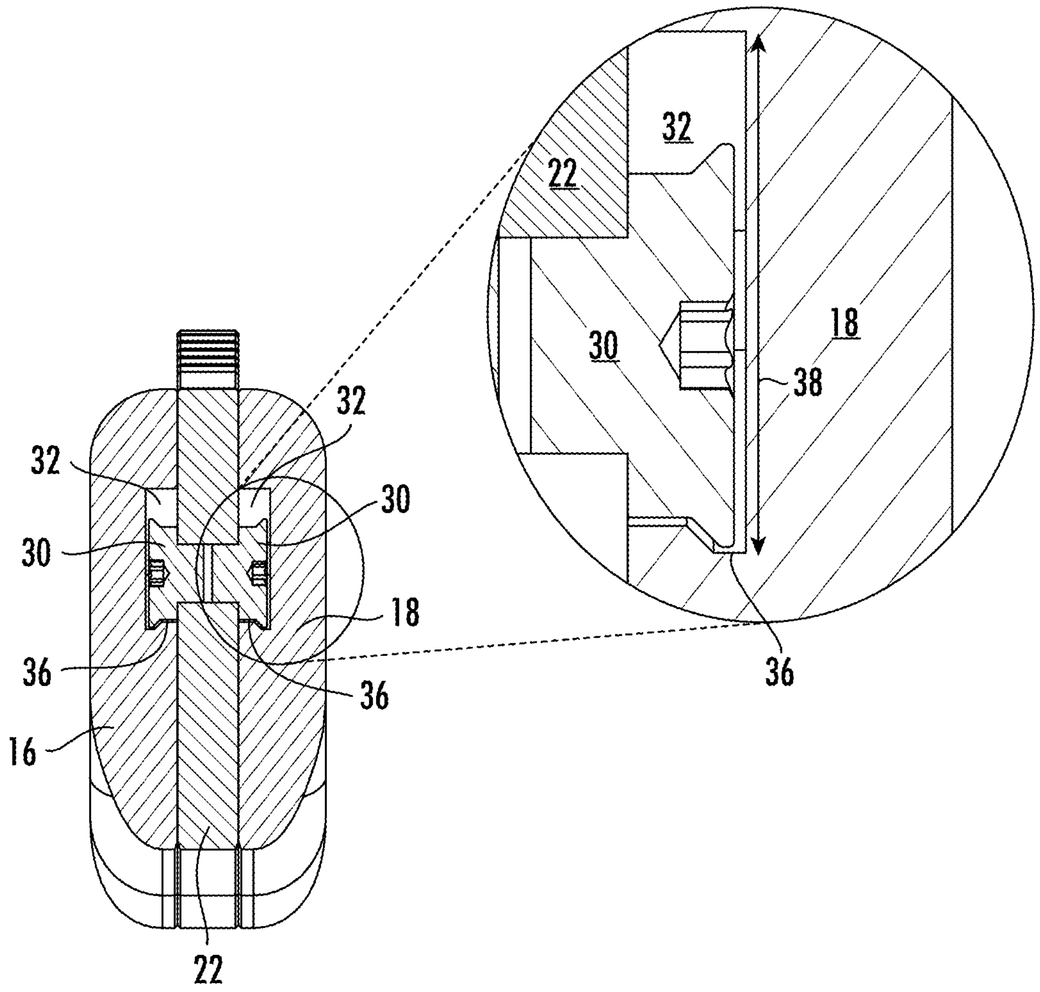
FIG. 9 is cross-section of the handle shown in FIG. 8 taken along 9-9.

FIGS. 7-9 provide a top plan view of the blade 14, a side plan view of the handle 12, and a cross-section of the handle, respectively, according to an alternate embodiment of the present invention. As shown in FIGS. 7 and 8, a pivot pin 50 has replaced the middle boss 30. The pivot pin 50 may be press fit or threaded into the tang 22 of the blade 14 and extends radially partially into the first and second scales 16, 18 to allow the first and second scales 16, 18 to slightly pivot with respect to the tang 22 of the blade 14. As shown most clearly in FIGS. 8 and 9, each recess 32 may be elongated radially at the respective first or second scale inner surface 24, 26. As a result, each scale 16, 18 may engage with the pivot pin 50 and then rotate slightly with respect to the tang 22 to slidingly engage each boss 30 with the flange 36 in the corresponding recess 32. Once the bosses 30 are engaged with the flanges 36 in the corresponding recesses 32, the left and right screws 40, 42 may releasably connect the left and right scales 16, 18, respectively, to the threads 44 in the tang 22, thereby releasably connecting the left scale 16 to the right scale 18.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A fixed blade knife, comprising:

a first scale, wherein the first scale has a first scale inner surface;

a second scale opposed to the first scale, wherein the second scale has a second scale inner surface;

a blade having a cutting edge that extends from the first and second scales and a tang that extends between the first scale inner surface and the second scale inner surface;

a first recess in the first scale inner surface that extends from the first scale inner surface partially through the first scale;

a first flange around at least a portion of the first recess in the first scale inner surface;

a first boss that extends from the tang of the blade into the first recess in the first scale inner surface;

a perimeter of the first boss that increases away from the tang of the blade; and a pivot pin that extends from the tang of the blade through at least one of the first scale inner surface or the second scale inner surface.

2. The fixed blade knife as in claim 1, wherein the first boss is threaded into the tang of the blade.

3. The fixed blade knife as in claim 1, wherein the first recess is elongated, and the first boss slidingly engages with the first flange around at least a portion of the first recess in the first scale inner surface.

4. The fixed blade knife as in claim 1, further comprising a means for releasably connecting the first scale to the second scale.

5. The fixed blade knife as in claim 1, further comprising:

a second recess in the second scale inner surface that extends from the second scale inner surface partially through the second scale;

a second flange around at least a portion of the second recess in the second scale inner surface;

a second boss that extends from the tang of the blade into the second recess in the second scale inner surface; and a perimeter of the second boss that increases away from the tang of the blade.

6. A fixed blade knife, comprising:

a first scale, wherein the first scale has a first scale inner surface;

a second scale opposed to the first scale, wherein the second scale has a second scale inner surface;

a blade having a tang that extends between the first scale inner surface and the second scale inner surface;

a first recess in the first scale inner surface that extends from the first scale inner surface partially through the first scale;

a diameter of the first recess that decreases toward the first scale inner surface;

a first boss that extends from the tang of the blade into the first recess in the first scale inner surface;

a perimeter of the first boss that increases away from the tang of the blade;

a second recess in the second scale inner surface that extends from the second scale inner surface partially through the second scale;

a diameter of the second recess that decreases toward the second scale inner surface;

a second boss that extends from the tang of the blade into the second recess in the second scale inner surface; and a perimeter of the second boss that increases away from the tang of the blade.

7. The fixed blade knife as in claim 6, wherein the first boss is threaded into the tang of the blade.

8. The fixed blade knife as in claim 6, wherein the first recess is elongated, and the perimeter of the first boss slidingly engages with the diameter of the first recess.

9. The fixed blade knife as in claim 6, further comprising a means for releasably connecting the first scale to the second scale.

10. The fixed blade knife as in claim 6, further comprising a pivot pin that extends from the tang of the blade through at least one of the first scale inner surface or the second scale inner surface.

11. A fixed blade knife, comprising:

a first scale, wherein the first scale has a first scale inner surface;

a second scale opposed to the first scale, wherein the second scale has a second scale inner surface;

a blade having a tang that extends between the first scale inner surface and the second scale inner surface;

a means for aligning the first scale to the second scale; and a pivot pin that extends from the tang of the blade through at least one of the first scale inner surface or the second scale inner surface.

12. The fixed blade knife as in claim 11, wherein the means for aligning the first scale to the second scale comprises a plurality of recesses in the first scale inner surface, each recess extends from the first scale inner surface partially through the first scale, and each recess has a diameter that decreases toward the first scale inner surface.

13. The fixed blade knife as in claim 11, wherein the means for aligning the first scale to the second scale comprises a plurality of bosses that extend from the tang of the blade, and each boss has a perimeter that increases away from the tang of the blade.

14. The fixed blade knife as in claim 13, wherein each boss is threaded into the tang of the blade.

15. The fixed blade knife as in claim 11, further comprising a means for releasably connecting the first scale to the second scale.

* * * * *